US012726680B2

(12) United States Patent
Chandrashekar et al.

(10) Patent No.: US 12,726,680 B2
(45) Date of Patent: Sep. 1, 2026

(54) SYSTEMS AND METHODS TO PROVIDE ADAPTIVE PLAY SETTINGS

(71) Applicant: Adeia Guides Inc., San Jose, CA (US)

(72) Inventors: Padmassri Chandrashekar, Bangalore (IN); Daina Emmanuel, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/209,750

(22) Filed: Mar. 23, 2021

(65) Prior Publication Data

US 2022/0312079 A1 Sep. 29, 2022

(51) Int. Cl.

*H04N 21/472* (2011.01)
*H04N 21/2387* (2011.01)
*H04N 21/442* (2011.01)
*H04N 21/475* (2011.01)
*H04N 21/6587* (2011.01)
*H04N 21/845* (2011.01)

(52) U.S. Cl.

CPC ... *H04N 21/47217* (2013.01); *H04N 21/2387* (2013.01); *H04N 21/44222* (2013.01); *H04N 21/4753* (2013.01); *H04N 21/6587* (2013.01); *H04N 21/8456* (2013.01)

(58) Field of Classification Search

None

See application file for complete search history.

(56) References Cited

U.S. PATENT DOCUMENTS

2002/0039481 A1* 4/2002 Jun ........ G11B 27/105 375/E7.162
2003/0123850 A1* 7/2003 Jun ........ H04N 21/440281 348/E7.054
2007/0071406 A1* 3/2007 Koga ........ G11B 27/28 386/243
2009/0103901 A1* 4/2009 Endo ........ G11B 27/322 386/241
2010/0124400 A1* 5/2010 Kim ........ H04N 5/783 386/241
2011/0249956 A1* 10/2011 Komai ........ H04N 21/472 386/248
2013/0031266 A1* 1/2013 Gilson ........ H04N 21/25891 709/232

(Continued)

FOREIGN PATENT DOCUMENTS

EP 1469476 A1 10/2004
JP 2013098751 A * 5/2013

(Continued)

*Primary Examiner* — Heather R Jones
(74) *Attorney, Agent, or Firm* — HG LAW LLP

(57) ABSTRACT

Systems and methods are provided for applying adaptive play settings to a media asset. One example method includes identifying a media asset selected for playback and retrieving a plurality of user preferences. The user preferences correlate a play function to a type of a segment of a media asset. A plurality of segments in the media asset selected for playback are identified and each of the plurality of segments has a respective type. In response to identifying a plurality of segments in the media asset selected for playback, a respective play function is assigned to each of the respective plurality of segments based on the respective type of each of the plurality of segments.

20 Claims, 10 Drawing Sheets

(56) References Cited

U.S. PATENT DOCUMENTS

2013/0212615 A1* 8/2013 Schultz ................ H04N 21/441
725/25
2013/0294755 A1 11/2013 Arme et al.
2013/0297706 A1* 11/2013 Arme ................. H04N 21/8455
709/206
2014/0036152 A1* 2/2014 Jackson ................. H04N 21/47
348/E5.099
2020/0145737 A1* 5/2020 Su ...................... H04N 21/8541
2022/0060795 A1* 2/2022 Krone ................ H04N 21/8106
2022/0070526 A1* 3/2022 Aithal .................... H04N 21/84

FOREIGN PATENT DOCUMENTS

WO 2016209400 A1 12/2016
WO 2019054992 A1 3/2019

* cited by examiner

104
Identify a Plurality of Segments in the Media Asset
106
Assign Respective Play Function to Each Segment
102
User Preferences
100
"The Walking Dead"

| Type of Segment | User Interests | Assigned Playback Speed | Start Time and End Time |
|---|---|---|---|
| High in Conversation | YES | Normal | 03:46 - 11:18 |
| Music | NO | Skip | 15:27 - 20:00 |
| Comedy | YES | Normal | 00:00 - 03:45 |
| Emotional and/or Sad | NO | 2.5x | 11:19 - 15:26 |

| Type of Segment | User Interests | Assigned Playback Speed |
|---|---|---|
| Sport - Football | YES | 1.1x |
| Flashing Lights | NO | Skip |
| Comedy | YES | Normal |

SYSTEMS AND METHODS TO PROVIDE ADAPTIVE PLAY SETTINGS

BACKGROUND

The present disclosure is directed to systems and methods for providing a user with an adaptable binge-watching experience, and more particularly, to systems and methods that provide a user with an adaptable binge-watching experience available through an interactive interface allows the user to select or adjust the playback speeds or skip segments of a media content item corresponding to settings based on the user's preferences corresponding to subject matter displayed in each segment of the media content item.

SUMMARY

Current systems provide an interface where a user can manually fast-forward through or skip portions of a media content item. Where fast-forward is enabled, a single speed can be selected for the duration the user allows the media asset to play at the elevated speed. The fast-forward speed is manually selected and adjusted by the user. Where a skip of a set of frames or of a scene is selected, the skip only occurs once a user provides an input. Additionally, the skip function is for a set duration based on what the interface allows.

Other approaches may skip portions of a media asset based on past behavior and will not provide a user an option to adjust a preference for a particular media asset. For example, if a scene is deemed scary and a user performs the skip function, certain approaches may only enable the user the option to skip or not to skip an upcoming scary scene. A user is not able to change a setting for a particular scene "type" and may only select an option to prevent the function from skipping the scene or fast-forwarding through the scene, depending on which function has been correlated to the scene type by the user profile. The user may then manually request a new or substitute skip or fast-forward function be executed. However, this single instance of exiting out of a function recommended by an interactive interface and manually enabling a different function may not adjust the user preferences for future segments. Additionally, if a user wishes to binge-watch a series of episodes, this manual adjustment may discourage the user from binge-watching.

The systems and methods described herein are for an adaptable binge-watching experience available through an interactive interface that generates recommendations for skipping or fast-forwarding through segments of a media asset selected for a play function based on the subject matter of each of a plurality of segments of the selected media asset. A plurality of user activity is collected in order to identify the user's preference for categories of subject matter in media assets. For example, a user may have an interest in conversations and may historically play back conversations at normal speed but may not have an interest in musical portions of media assets and may have often skipped over the musical portions of past viewed media assets. The user's interests are then categorized. For example, an action corresponding to a normal play speed may be correlated to a media asset portion category such as conversations, while an action corresponding to a skip function may be correlated to a media asset portion category such as musical scenes.

When a user selects a media asset for playback, portions of the media asset are identified, and if it is determined that a portion corresponds to a category that has a user action preference correlated by past user viewing activity, a playback action is assigned to that portion of the media asset selected for playback. Once the media asset has been reviewed for portions corresponding to user preference categories and preferred user actions, a playback-function map is generated for the user to review and adjust before commencing playback of the media asset.

These techniques solve the problems of other approaches described above. In particular, this approach does not require a user to manually input a set of speed preferences for different segments of a media asset. Instead, the system retrieves preference data from past activity and generates a map of recommendations that provides a set of speed or skip settings for different segments of a media asset based on the user's past activity. Thus, the recommendation map generated will be automatically populated based on user activity accrued up until the selection of a new series to binge-watch. Additionally, this approach does not require a user to make a decision as a scene approaches regarding the type of play operation that is to be performed. By generating the recommendation map through an analysis of the series selected for play with the adaptive binge mode enabled, a user is provided an opportunity to preview and adjust their viewing experience based on the recommendations for each segment, as opposed to waiting for a particular segment to be displayed before making a decision as to how that segment should be displayed. The approach also addresses the deficiencies in some current approaches where a user has to regularly interact with the portion being displayed and cannot sit back and enjoy the binge-watching experience.

Systems and methods are described herein for applying adaptive play settings to a media asset. In accordance with an aspect of the disclosure, a method is provided for applying adaptive play settings to a media asset. The method includes identifying a media asset selected for playback and retrieving a plurality of user preferences. The user preferences correlate a play function to a type of a segment of a media asset. Different users of the same platform and at the same device may have different preferences, which may be identified via different user profiles. For example, when a first user logs in to an on-demand platform, a first set of user preferences may be retrieved, and when a second user logs in to the on-demand platform, a second set of user preferences may be retrieved. A plurality of segments in the media asset are identified and are selected for playback, where each of the plurality of segments has a respective type. In response to identifying a plurality of segments in the media asset selected for playback, a respective play function is assigned to each of the respective plurality of segments based on the respective type of each of the plurality of segments. In an example system, a user may watch an on-demand video on a computing device, such as a smart television; for example, the user may stream the video from an on-demand platform via the internet. The user may select a "binge" mode on the platform (i.e., a mode that assigns different play functions/speeds to different segments of a media asset) and identify a media asset for playback, for example an episode of "The Walking Dead." User preferences may indicate that segments comprising music may be played at an increased speed compared to normal, whereas segments comprising two people talking may be played at normal speed. The user preferences may be pre-populated and/or may be determined as a user consumes content. For example, a pre-populated user preference may be to play back segments comprising speech at normal speed. However, if a user, over time, adjusts the playback speed of segments comprising speed to one and a half times normal speed, the user preference may be automatically updated to reflect this. In another example, a user may be able to choose different preferences for different segment types. A further example includes monitoring all users, or a subsection of users, of an on-demand platform and monitoring typical user preferences. This may comprise monitoring user preferences for a segment type, such as "music" and/or user preferences for segments of a specific episode of, for example, "The Walking Dead." A number of segments may be identified in the selected episode. The segments may be identified via metadata that is transmitted to the smart television, via flags that are transmitted to the smart television, and/or via a machine learning algorithm. For example, for an on-demand platform, a machine learning algorithm may be trained on a dataset comprising settings selected by all, or a subset of, subscribers to the platform. Where segments are identified via a machine learning algorithm, the identification may be performed by the smart television, or the segments may be identified remotely from the smart television. Where the segments are identified remotely from the smart television, this may be performed, for example, at a server connected to the smart television via the internet, and the results of the identification may be transmitted to the smart television. In this example, the selected episode comprises a first segment, in which music is played, and a second segment, in which two people are talking. Based on the user preferences and the identified segments, a play-function map (or playback-speed map) may be computed in order to determine what play function (i.e., playback speed) should be applied to which segment. The play-function map maps a play function to a segment of the media asset, based on the user preferences. For example, the playback speed for the first segment may be twice as fast as normal, and the playback speed for the second segment may be normal.

Although the examples above describe different playback speeds, other play functions may be applied to the different segments. For example, one or more segments may have a different picture and/or sound quality applied to them. For example, a play function may indicate that some segments of a media asset should be standard definition, where the media asset is otherwise high definition. This may be of use when the playback speed has been increased, and it may be beneficial to transmit the corresponding segment in standard definition to meet, for example, bandwidth constraints. In another example, a media asset may comprise a video track and an audio track. The video track and the audio track may be segmented separately, and different play functions may be applied to each of those segments. A media asset may comprise two video segments and four audio segments. Two of the audio segments may correspond to one of the video segments, such that the total playing time of the video segment and the two audio segments is the same, for example. A play function may indicate that the video of a segment of the media asset should be at an increased play speed, such as 1.5×, whereas a first audio segment should be normal speed and a second audio segment should be at 2.5× speed. This may be of use, for example, where the video track has a relatively slow pace, the first audio track comprises lots of dialogue and the second audio track comprises music. A check may be made, for example, at the end of each segment to ensure that the audio and video tracks are still synchronized. Different combinations of playback speed, quality and segmentation may be applied to a media asset.

In another example, a user may provide a target time by which they want to have watched one or more episodes. The target time may be provided as a user preference in a user settings page. For example, the user may wish to watch two episodes in an hour; however, each episode is 35 minutes long. The target time may be used as an additional constraint when assigning a respective play function to each of the respective plurality of segments. In this example, the total viewing time needs to be decreased by 10 minutes. Thus, respective play functions may be assigned to the episode segments such that the total viewing time is decreased by 10 minutes and not by more than this amount. This may, for example, include speeding up a first segment of each episode comprising music, but not a subsequent segment. The two episodes may be reduced by the same amount, such that the play time of each episode is broadly the same. Alternatively, if, for example, a first episode comprises many music segments and the second episode does not, then the first episode may be reduced by a larger amount of time than the second episode. In another example, an application, such as a video-on-demand application, may be connected to a user's calendar and/or another application indicating a user's commute. Information from the user's calendar and/or other application indicating a user's commute may be used by the video-on-demand application to estimate a suitable target time.

A play-function map may be generated for display, wherein the play-function map shows each of the plurality of segments in the media asset selected for playback and each of the respective play-functions assigned to each of the respective plurality of segments. The play function map may also comprise a selectable interface that allows adjustment of the respective play functions assigned to each of the respective plurality of segments. Continuing the aforementioned example, the displayed play-function map may indicate to the user that the selected episode of "The Walking Dead" comprises a first segment and a second segment and that the first segment will be played back at twice normal speed and that the second segment will be played back at normal speed. A user may be able to select each of these segments and adjust the playback speed, for example, normal playback speed, half, twice, three times, four times and/or five times normal playback speed. In another example, the user may be able to skip the segment entirely.

Each of the plurality of segments may comprise a scene of the media asset selected for playback. The portions of the media asset that are categorized, for example, a scene of the media asset may be defined by a start time stamp and an end time stamp. Portions, or segments, may be identified by auxiliary data corresponding to individual frames of a media asset or by other flags encoded in a particular media asset. The flags may be encoded by the platform through which the media asset is made available to the stored user profile. During playback of the media asset, a first start time stamp of a first scene may be detected, and, in response to detecting the first start time stamp of the first scene, a corresponding play function based on the type of the first scene and the corresponding user preference may be identified. It may be determined that the media asset has reached the first time stamp of the first scene and, in response to determining the media asset has reached the first time stamp of the first scene, the corresponding play function on the first scene may be performed.

There may be a plurality of stored user profiles and there may be unique playback preferences corresponding to each profile. Accordingly, a particular media asset may have a different playback-speed map depending on which stored user profile is active when the media asset is selected for playback. Retrieving a plurality of user preferences may comprise identifying, based on a user authentication, an active stored user profile and retrieving, from storage, an activity history corresponding to the stored user profile, wherein the activity history comprises a viewing history of at least one media asset and at least one play action corresponding to at least one portion of the at least one media asset. In an example, the user profile may be stored on a server and retrieved, via the internet, by a smart television running an on-demand platform. In another example, the user profile may be stored locally, on the smart television.

The playback function for a particular segment may be adjusted without a user's intervention. A user may enable an automated play function option by setting a user preference setting in a stored user profile. In response to receiving an indication that the automated play function option has been enabled by a user preference setting in a stored user profile, a play-function map may be generated for display, and the play-function map may show each of the plurality of segments in the media asset selected for playback and each of the respective play functions assigned to each of the respective plurality of segments.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
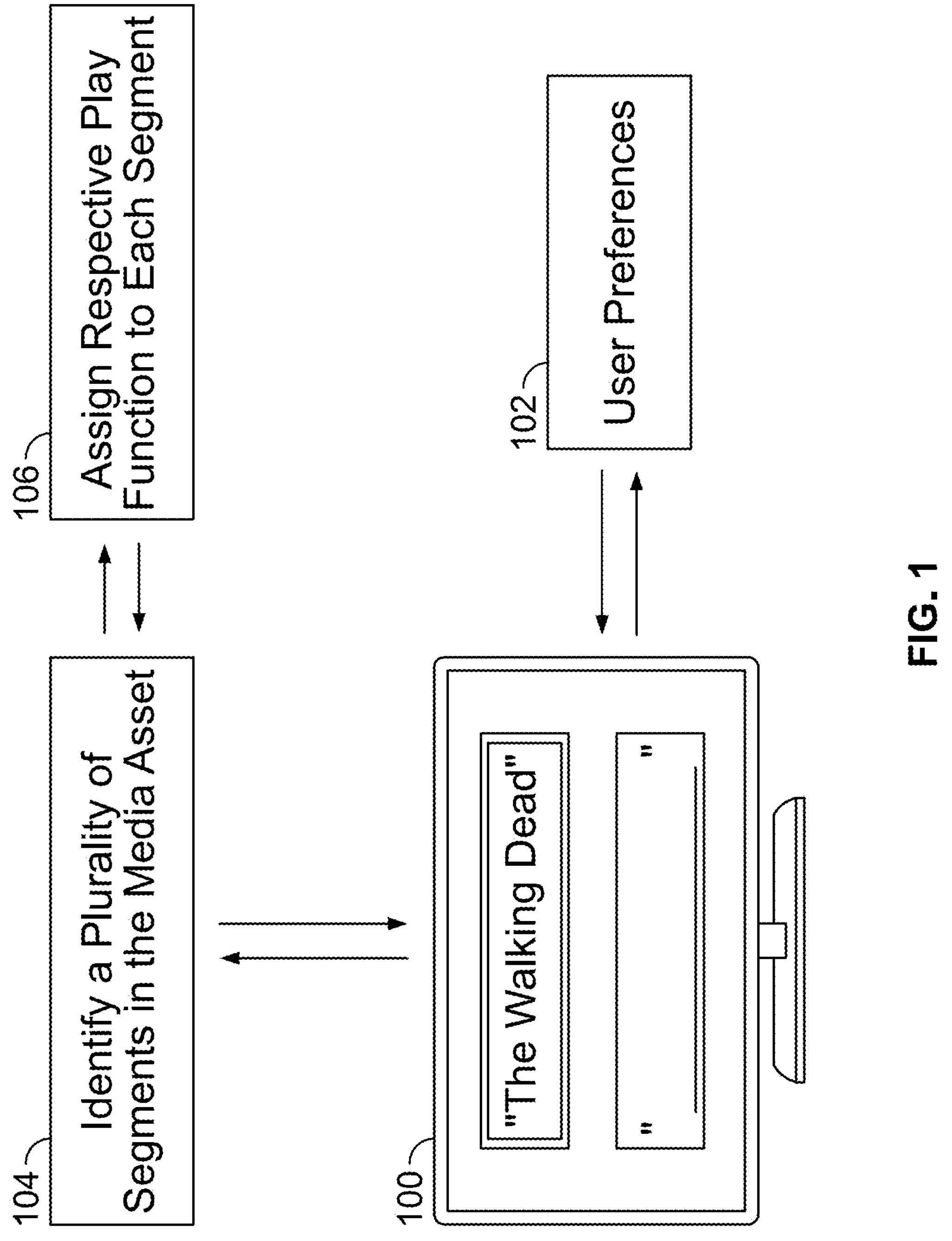
FIG. 1 shows an exemplary environment in which adaptive play settings are applied to a media asset, in accordance with some embodiments of the disclosure.

Systems and methods are described herein for applying adaptive play settings to a media asset. As referred to herein, adaptive play settings are settings, or play functions, that change the playback speed of a section, or segment, of a media asset. For example, the play function may cause a segment of a media asset to be skipped, played back at normal speed, played back at half speed, one and a half speed, double speed, 3× speed, 4× speed, 5.5× speed, 8× speed, 10× speed, 16× speed or any other multiple of playback speed. A media asset is any media content. The media content may be streamed live and/or streamed on demand to a computing device. On-demand content may also be downloaded to a computing device in response to a user request and/or according to a pre-set rule. Content includes audio, video and/or any other media content. Audio includes audio only content, such as songs. Video includes audiovisual content such as movies and/or television programs. The over-the-top content platform may be accessed via a website and/or an app running on a computing device.

A segment is a portion of a media asset and a media asset typically comprises many segments. A media asset may be split up into equal segments, and the type may be the dominating action and/or genre of the segment. Alternatively, a media asset may be split up into segments of varying lengths that are based on the type. For example, when there is a comedy scene, the segment may be as long as the scene. Such a scene may be defined by a start time stamp and an end time stamp. Segments are associated with different "types," which indicate the dominating action and/or genre of the segment. For example, types might include "comedy," "action," "drama," "fantasy," "horror," "mystery," "romance," "thriller," "sad," "emotional," "scary," "sport," "conversation," "conversation between two people," "conversation between multiple people," "music," "adult," "G" (for general audiences), "PG" (for parental guidance), "PG-13" (for parents strongly cautioned), "R" (for restricted) and/or "NC-17" (for adults). These segment types may be indicated via metadata and/or flags that are delivered to the computing device at the same time as the media asset.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an exemplary environment in which adaptive play settings are applied to a media asset, in accordance with some embodiments of the disclosure. A user selects a media asset for playback at smart television 100. The user may also select a "binge" mode setting, which enables different play functions to be applied to different segments of a media asset. The "binge" mode setting may be applied to, for example, a single episode, the remaining episodes in a season, a set period of time such as an hour, and/or a combination of a number of episodes and a time period, such as enabling two episodes to be watched in an hour. In other examples, the "binge" mode may always apply and not be a selectable setting. A plurality of user preferences that correlate a play function to a type of a segment of a media asset are retrieved 102. For example, a segment of a media asset that comprises lots of talking may be correlated with a normal play speed, and a segment of a media asset that comprises sport may be correlated with a faster play speed, such as a 2× play speed. The user preferences may be manually set by a user, may be pre-set user preferences and/or may be automatically adapted based on how a user interacts with different segments of media assets over time. For example, an indication of how a user reacts to different types may be recorded. Over time, this record can be analyzed to identify trends in the user behavior. For example, if a user consistently fast-forwards a "music" type at double speed, then the user preferences may be updated to indicate that "music" type segments should be played at double speed. In addition, the user preferences may be updated based on how other users of, for example, an on-demand platform apply different settings to different segments of a media asset. For example, if a majority of users select a faster play speed, such as 1.5× play speed, for a "music" type of segment, then this setting may be automatically applied to all users of the on-demand platform. In another example, a parent might set settings that prevents a child from watching "adult" type segments, for example by setting "adult" segments to skip. Such a setting may be protected by a password and/or a PIN code. Another feature may be the automatic implementation of thresholds. For example, if a segment includes dialogue, a threshold may be implemented such that the dialogue is still understandable. In another example, a threshold may be implemented for action sequences, such that a user can continue to follow the action, even if the playback speed has been increased. In addition to the user preferences, an active stored user profile may be identified, and an activity history corresponding to the stored user profile may be retrieved at 102. The active user profile may indicate whether the user has enabled the "binge" mode setting.

A plurality of segments in the media asset selected for playback are identified 104, wherein each of the plurality of segments has a respective type. For example, the first segment of a media asset may be identified as being the "music" type, the second segment of a media asset may be identified as being the "comedy" type and so forth. The segments may be identified via metadata that is transmitted to the smart television 100, for example via the Program and System Information Protocol (PSIP), via flags transmitted to the smart television and/or via a machine learning algorithm. Where segments are identified via a machine learning algorithm, the identification may be performed by the smart television, or the segments may be identified remotely from the smart television. The media assets may be stored at a location that is remote from the smart television 100, for example at a server of an on-demand provider. Such a provider may run such a machine learning algorithm on any media assets stored at the server and may store the results in a format that is accessible to the smart television 100. For example, for an on-demand platform, a machine learning algorithm may be trained on a dataset comprising settings selected by all, or a subset of, subscribers to the platform. In response to identifying a plurality of segments in the media asset selected for playback, a respective play function is assigned to each of the respective plurality of segments based on the respective type of each of the plurality of segments 106. For example, if a media asset has a first segment that is identified as "music," and a second segment that is identified as "comedy," and the user has indicated a preference of 1.5× play speed for the "music" type and "normal" play speed for the "comedy" type, then a 1.5× play function will be assigned to the first segment and a normal play function will be assigned to the second segment.

Figure 2A:
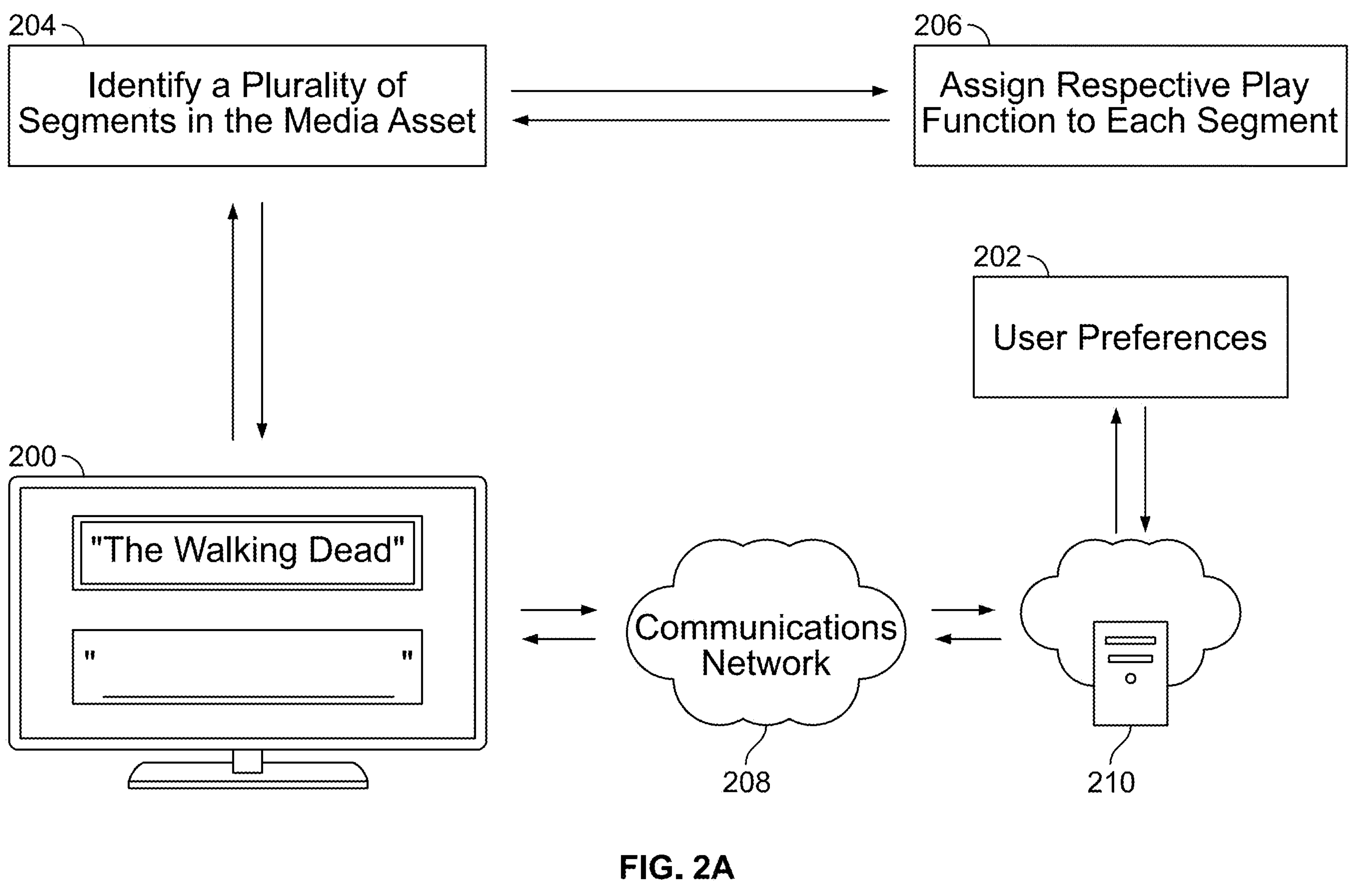
FIG. 2A shows another exemplary environment in which adaptive play settings are applied to a media asset, in accordance with some embodiments of the disclosure.

FIG. 2A is a further exemplary environment in which adaptive play settings are applied to a media asset, in accordance with some embodiments of the disclosure. In a similar manner to that shown in FIG. 1, a user selects a media asset for playback at smart television 200. The user may also select a "binge" mode setting, which enables different play functions to be applied to different segments of a media asset. In other examples, the "binge" mode may always apply and not be a selectable setting. A plurality of user preferences that correlate a play function to a type of a segment of a media asset are retrieved 202, via a communications network 208, from a server 210. The communications network 208 may include the internet and/or a local network and may include wired and/or wireless components. In addition to the user preferences, an active stored user profile may be identified and an activity history corresponding to the stored user profile may also be retrieved at 202. The active user profile may indicate whether the user has enabled the "binge" mode setting. Typically, such a setup would enable the user preferences and/or active stored user profile to be stored on a server remote from the smart television 200, such that a user may log in to a platform on an internet-connected device and retrieve their preferences and/or user profile. A plurality of segments in the media asset selected for playback are identified 204, wherein each of the plurality of segments has a respective type. In response to identifying a plurality of segments in the media asset selected for playback, a respective play function is assigned to each of the respective plurality of segments based on the respective type of each of the plurality of segments 206.

Figure 2B:
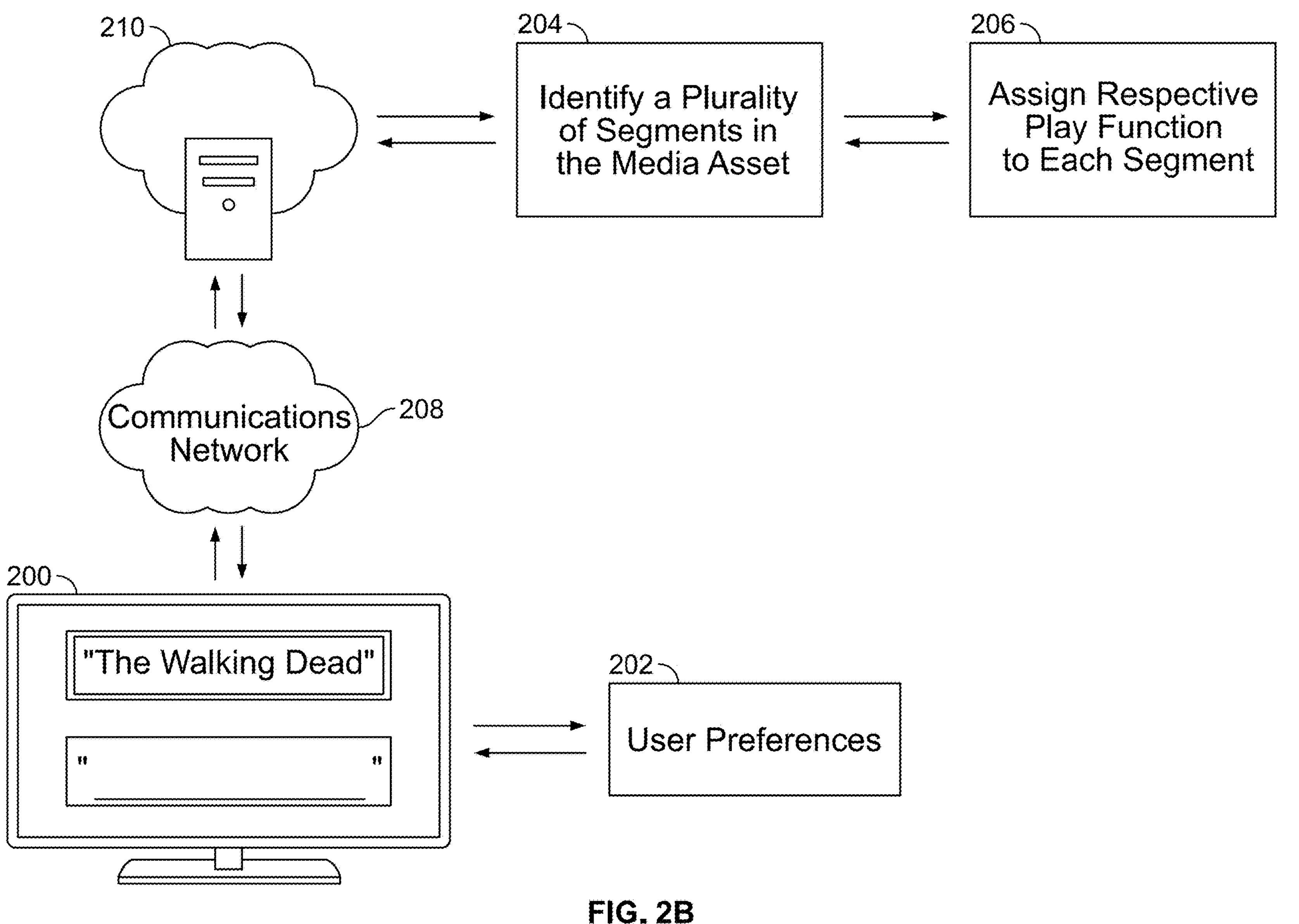
FIG. 2B shows another exemplary environment in which adaptive play settings are applied to a media asset, in accordance with some embodiments of the disclosure.
Figure 2C:
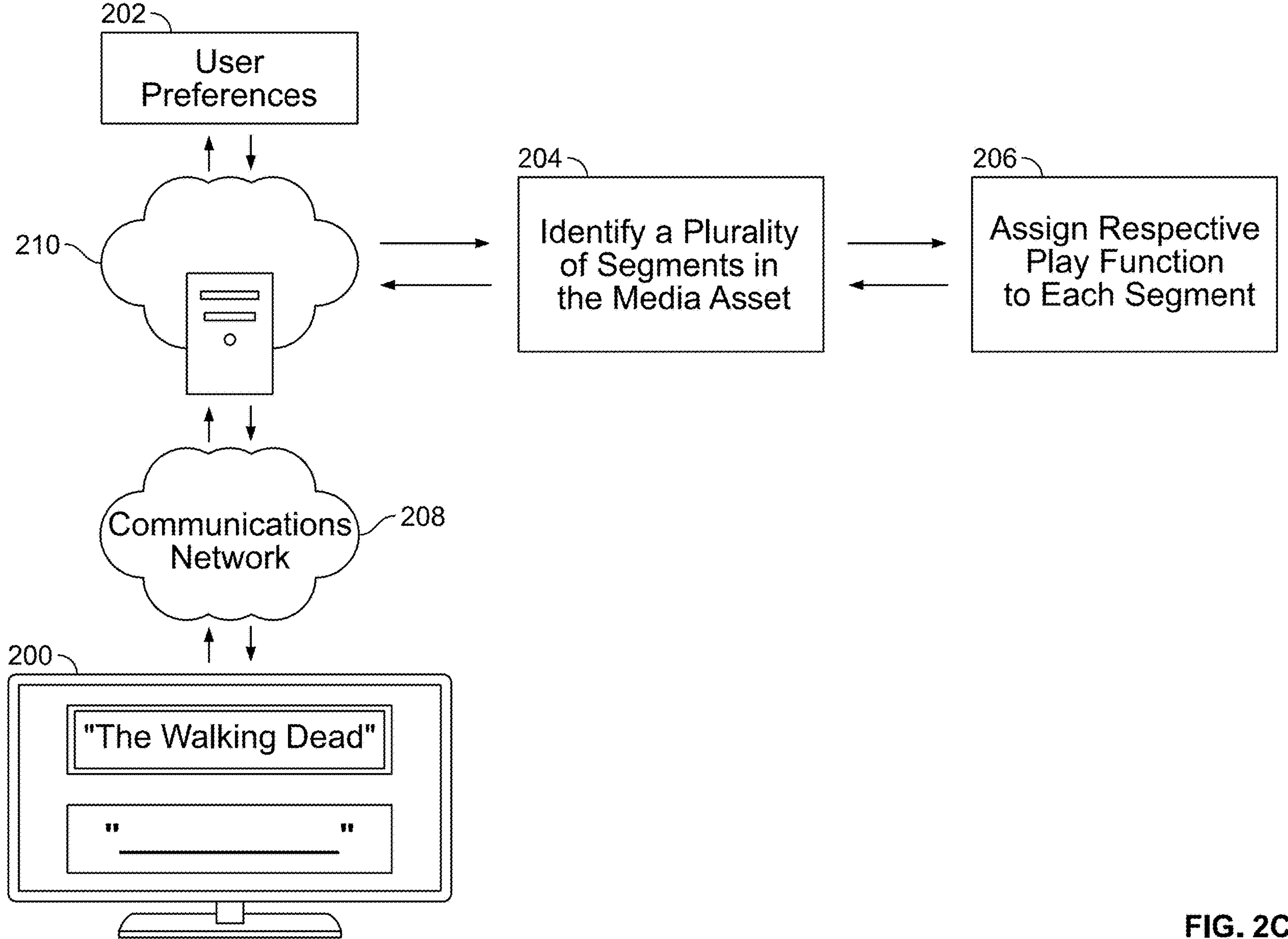
FIG. 2C shows another exemplary environment in which adaptive play settings are applied to a media asset, in accordance with some embodiments of the disclosure.

FIGS. 2B and 2C are further exemplary environments in which adaptive play settings are applied to a media asset, in accordance with some embodiments of the disclosure. FIG. 2B is a variation on the environment shown in FIG. 2A, wherein the identifying the plurality of segments in the media asset 204 and the assigning a respective play function to each segment 206 takes place, via a communications network 208, on a server 210. In a similar manner, the communications network 208 may include the internet and/or a local network and may include wired and/or wireless components. Typically, such a setup would enable a more computationally intensive method of identifying segments to take advantage of the increased computing power that is typically available at a server compared to a smart television, for example via machine learning algorithms. The identified segment types are then transmitted back to the smart television 200 via the network 208.

FIG. 2C is another variation on the environment shown in FIG. 2A, wherein the user preferences are retrieved 202 from a server 210 via communication network 208, and the identifying a plurality of segments 204 and the assigning the respective play function 206 takes place on the server 210. Such a system allows, for example, a user to enable a "binge" mode via a thin client accessing an on-demand platform.

Figure 3A:
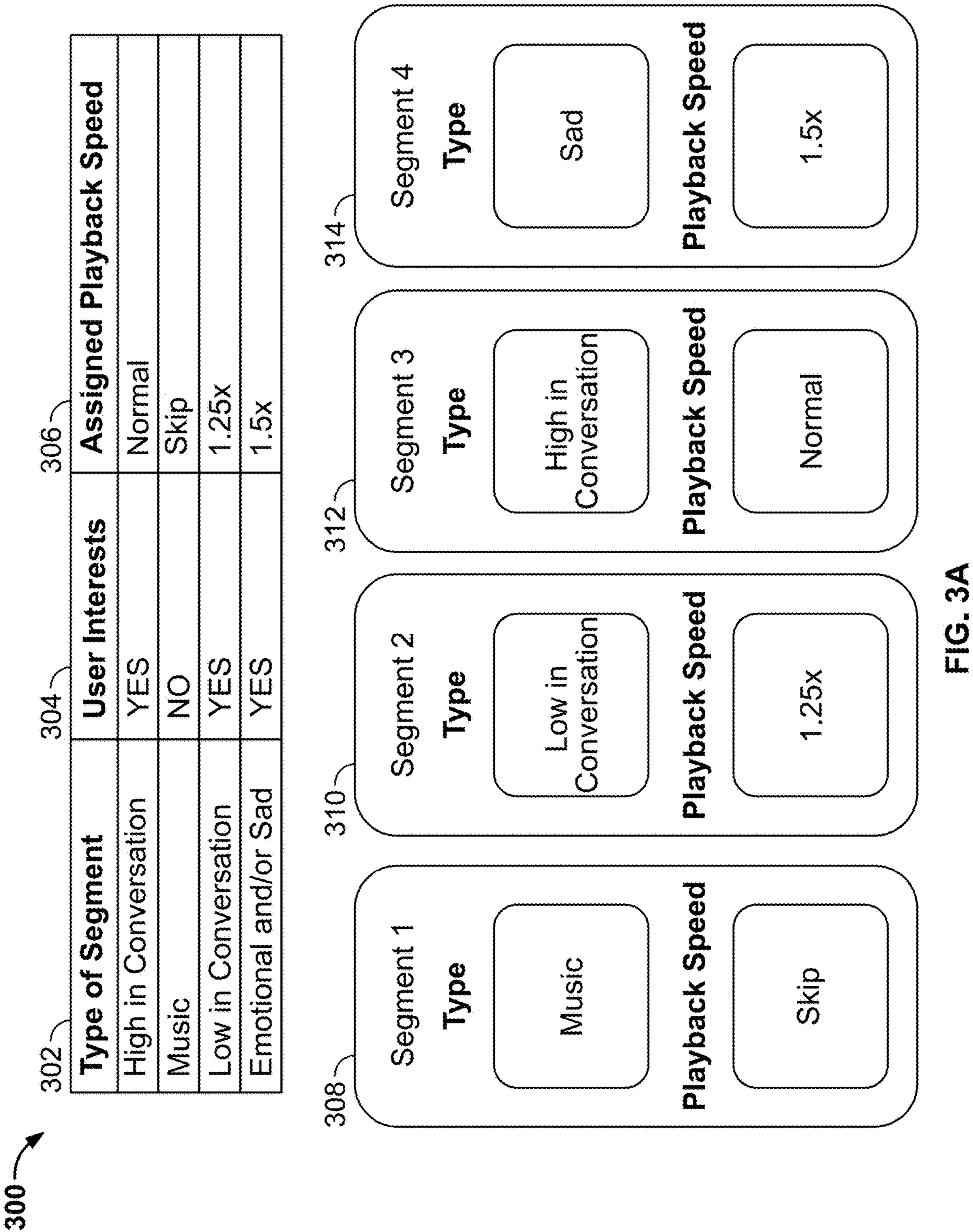
FIG. 3A is a diagram representing an exemplary playback-speed map and application of playback speeds to segments of a media asset, in accordance with some embodiments of the disclosure.

FIG. 3A is a diagram representing an exemplary playback-speed map (or play-function map) and application of playback speeds to segments of a media asset, in accordance with some embodiments of the disclosure. A playback-speed map is representation of how playback speeds are assigned to different segments of a media asset and indicates which play function will be applied to each segment of a media asset. The playback-speed map 300 comprises the types of segment 302 that are present in a media asset, in this example "high in conversation," "music," "low in conversation," and "emotional and/or sad." The playback-speed map 300 also indicates whether a user is interested in the type of segment, i.e., the user interests 304. These are obtained via the received plurality of user preferences. The playback-speed map 300 indicates the play function, i.e., the assigned playback speed 306, that will be applied to each segment. The different segments 308, 310, 312, 314 of a media asset are of different types, and playback speeds are applied to each segment according to the identified type and the user preferences, as indicated in the playback-speed map 300.

Figure 3B:
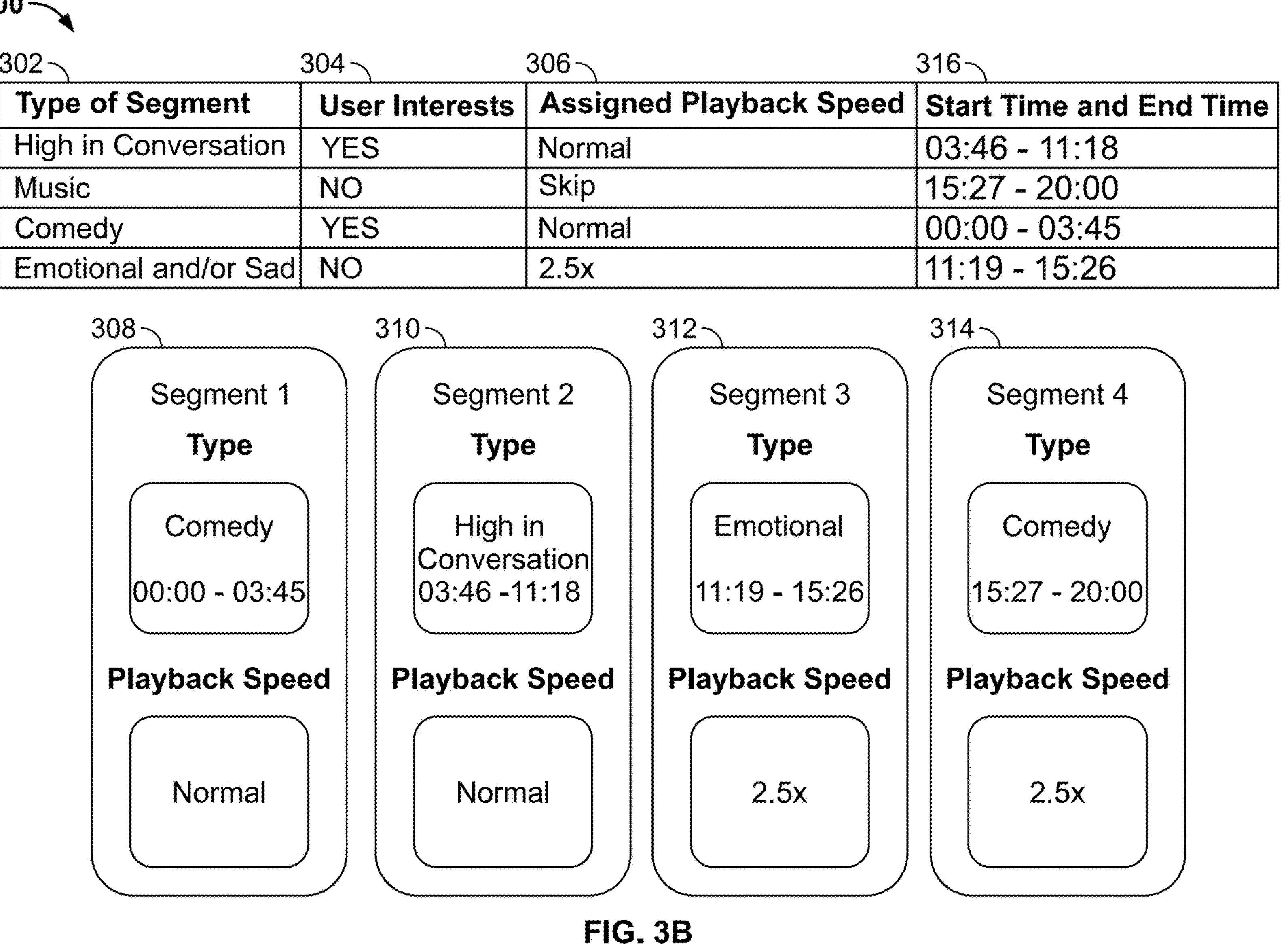
FIG. 3B is another diagram representing an exemplary playback-speed map and application of playback speeds to segments of a media asset, in accordance with some embodiments of the disclosure.

FIG. 3B is another diagram representing an exemplary playback-speed map (or play-function map) and application of playback speeds to segments of a media asset, in accordance with some embodiments of the disclosure. The playback-speed map 300 comprises the types of segment 302 that are present in a media asset, in this example "high in conversation," "music," "comedy," and "emotional and/or sad." The playback-speed map 300 also indicates whether a user is interested in the type of segment, i.e., the user interests 304. These are obtained via the received plurality of user preferences. The playback-speed map 300 indicates the play function, i.e., the assigned playback speed 306, that will be applied to each segment and the start time and end time 316 of each segment. The different segments 308, 310, 312, 314 of a media asset are of different types, and playback speeds are applied to each segment according to the identified type and the user preferences, as indicated in the playback-speed map 300. In this particular example, the "music" type is not present in the first four segments of the media asset.

Figure 3C:
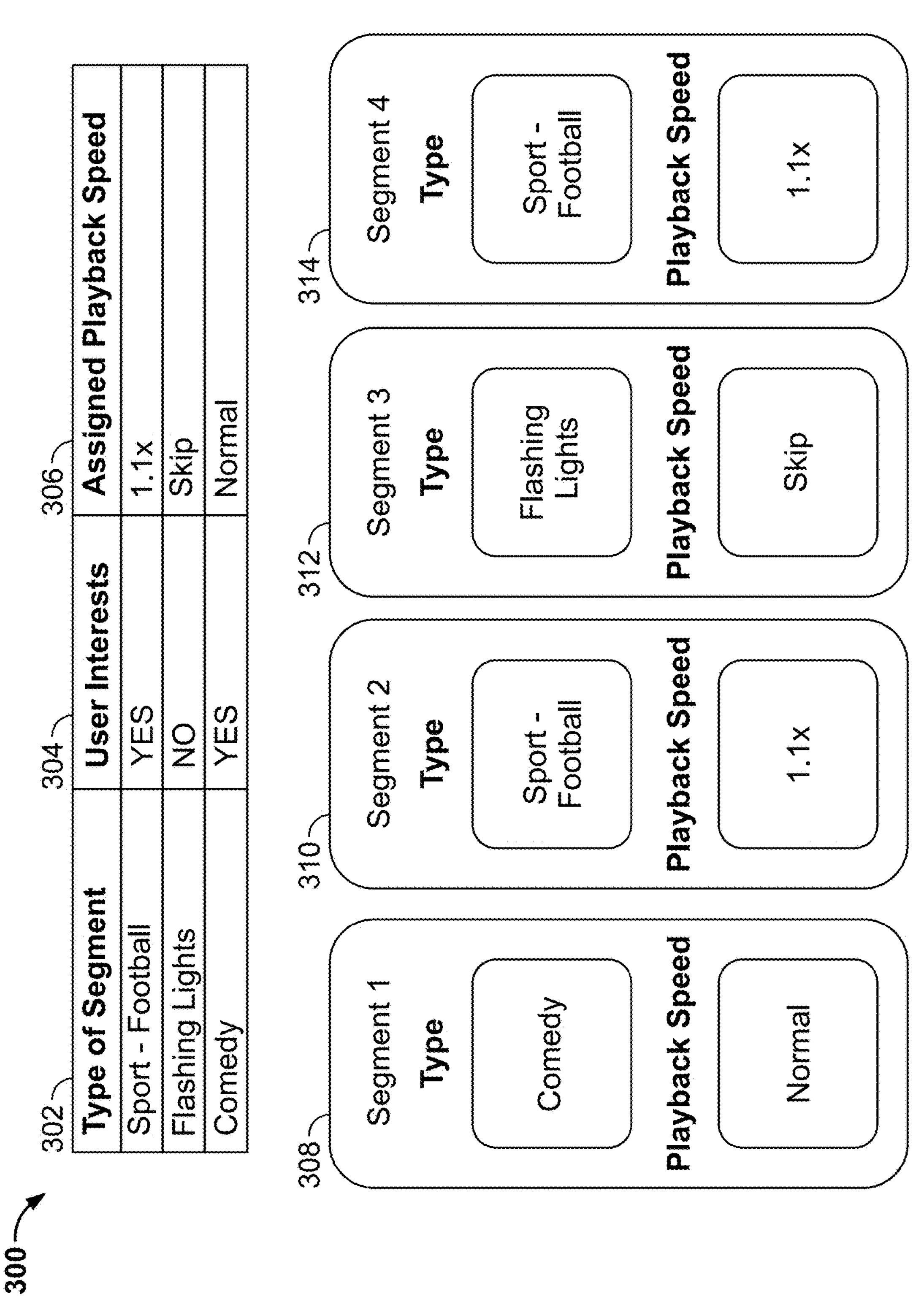
FIG. 3C is another diagram representing an exemplary playback-speed map and application of playback speeds to segments of a media asset, in accordance with some embodiments of the disclosure.

FIG. 3C is another diagram representing an exemplary playback-speed map (or play-function map) and application of playback speeds to segments of a media asset, in accordance with some embodiments of the disclosure. The playback-speed map 300 comprises the types of segment 302 that are present in a media asset, in this example "sport—football," "flashing lights" and "comedy." The playback-speed map 300 also indicates whether a user is interested in the type of segment, i.e., the user interests 304. These are obtained via the received plurality of user preferences. The playback-speed map 300 indicates the play function, i.e., the assigned playback speed 306, that will be applied to each segment. The different segments 308, 310, 312, 314 of a media asset are of different types, and playback speeds are applied to each segment according to the identified type and the user preferences, as indicated in the playback-speed map 300. In this example, a user who is averse to flashing lights may utilize the "binge" mode to skip sections of a media asset that comprise flashing lights.

Figure 3D:
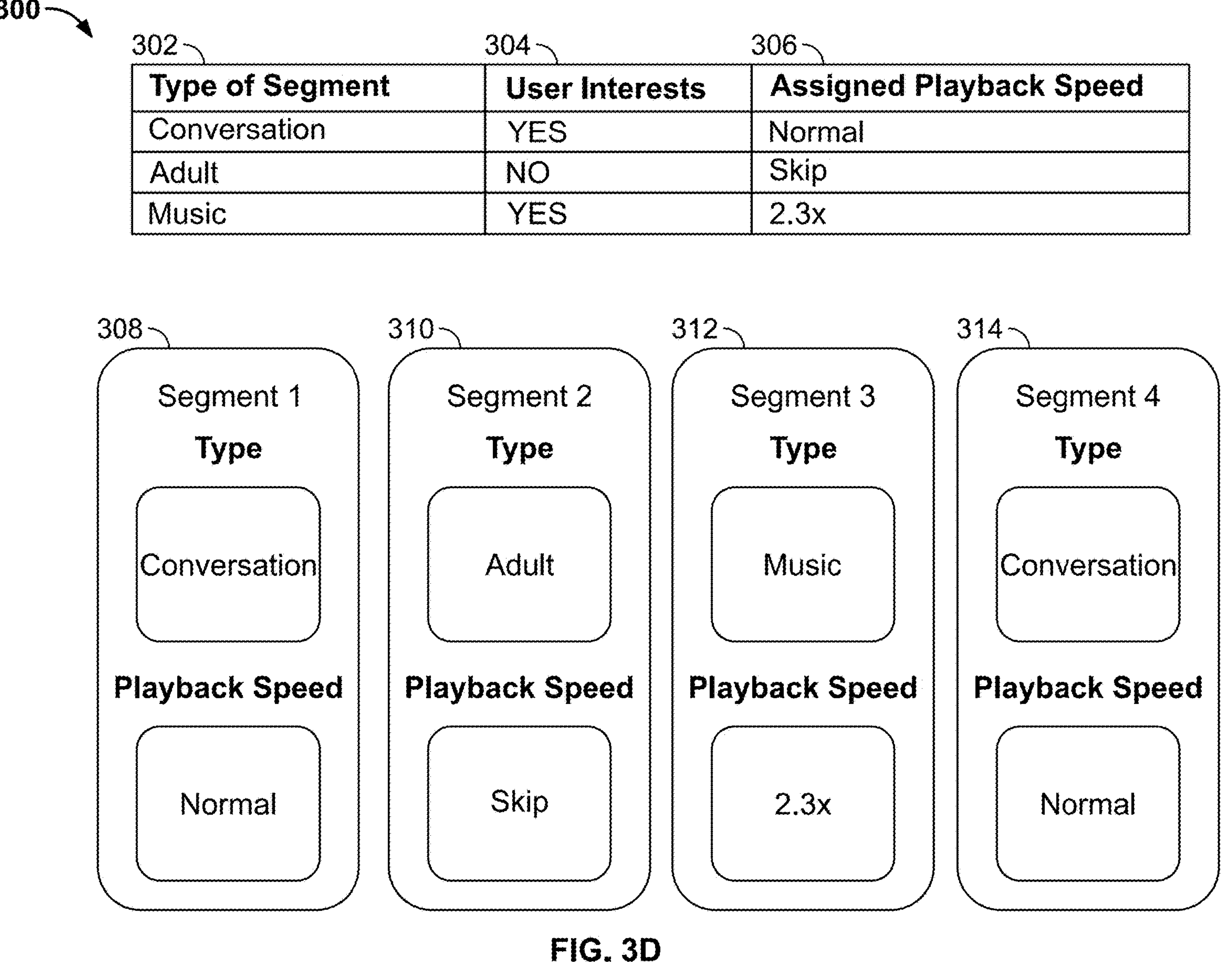
FIG. 3D is another diagram representing an exemplary playback-speed map and application of playback speeds to segments of a media asset, in accordance with some embodiments of the disclosure

FIG. 3D is another diagram representing an exemplary playback-speed map (or play-function map) and application of playback speeds to segments of a media asset, in accordance with some embodiments of the disclosure. The playback-speed map 300 comprises the types of segment 302 that are present in a media asset, in this example "conversation," "adult" and "music." The playback-speed map 300 also indicates whether a user is interested in the type of segment, i.e., the user interests 304. These are obtained via the received plurality of user preferences. The playback-speed map 300 indicates the play function, i.e., the assigned playback speed 306, that will be applied to each segment. The different segments 308, 310, 312, 314 of a media asset are of different types, and playback speeds are applied to each segment according to the identified type and the user preferences, as indicated in the playback-speed map 300. In this example, a parent may utilize the "binge" mode by setting the "adult" type to "skip" in order to prevent a younger member of the household from watching unsuitable content. Such a setting may additionally be protected by a password and/or PIN code.

Figure 4:
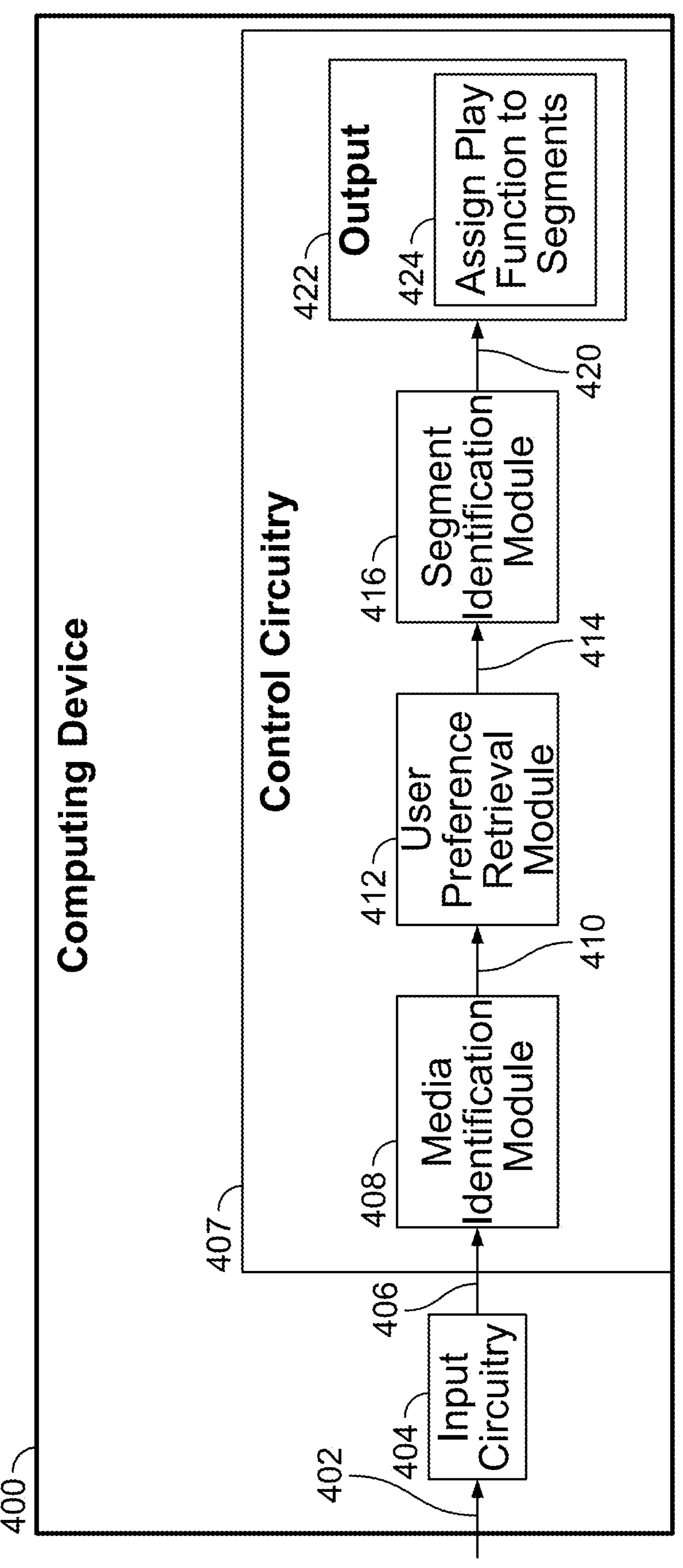
FIG. 4 is a block diagram representing components of a computing device and data flow therebetween for applying adaptive play settings to a media asset, in accordance with some embodiments of the disclosure.

FIG. 4 is a block diagram representing components of a computing device and data flow therebetween for applying adaptive play settings to a media asset, in accordance with some embodiments of the disclosure. Computing device 400 (e.g., a smart television 100, 200 as discussed in connection with FIGS. 1-2) comprises input circuitry 404, control circuitry 407 and an output module 422. Control circuitry 407 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor). Some control circuits may be implemented in hardware, firmware, or software.

A user provides an input 402 that is received by the input circuitry 404. The input circuitry 404 is configured to receive a user input related to a computing device. For example, this may be via a touchscreen, keyboard, mouse, microphone and/or infra-red controller of the computing device 400. The input circuitry 404 transmits 406 the user input to the control circuitry 407.

The control circuitry 407 comprises a media identification module 408, a user preference retrieval module 412, a segment identification module 416 and an output module 422. The user input is transmitted 406 to the media identification module 408. At the media identification module 408, a media asset selected for playback is identified. The identified media asset is transferred 410 to the user preference retrieval module 412, where user preferences are retrieved. The identified media asset and the retrieved user preferences are transferred 414 to the segment identification module 416, wherein segments of the media asset are identified, each segment having a respective type. The identified media asset, retrieved user preferences and identified segments are transmitted 420 to the output module 422, where a play function is assigned to the segments of the identified media asset 424, based on the retrieved user preferences and the identified segments.

Figure 5:
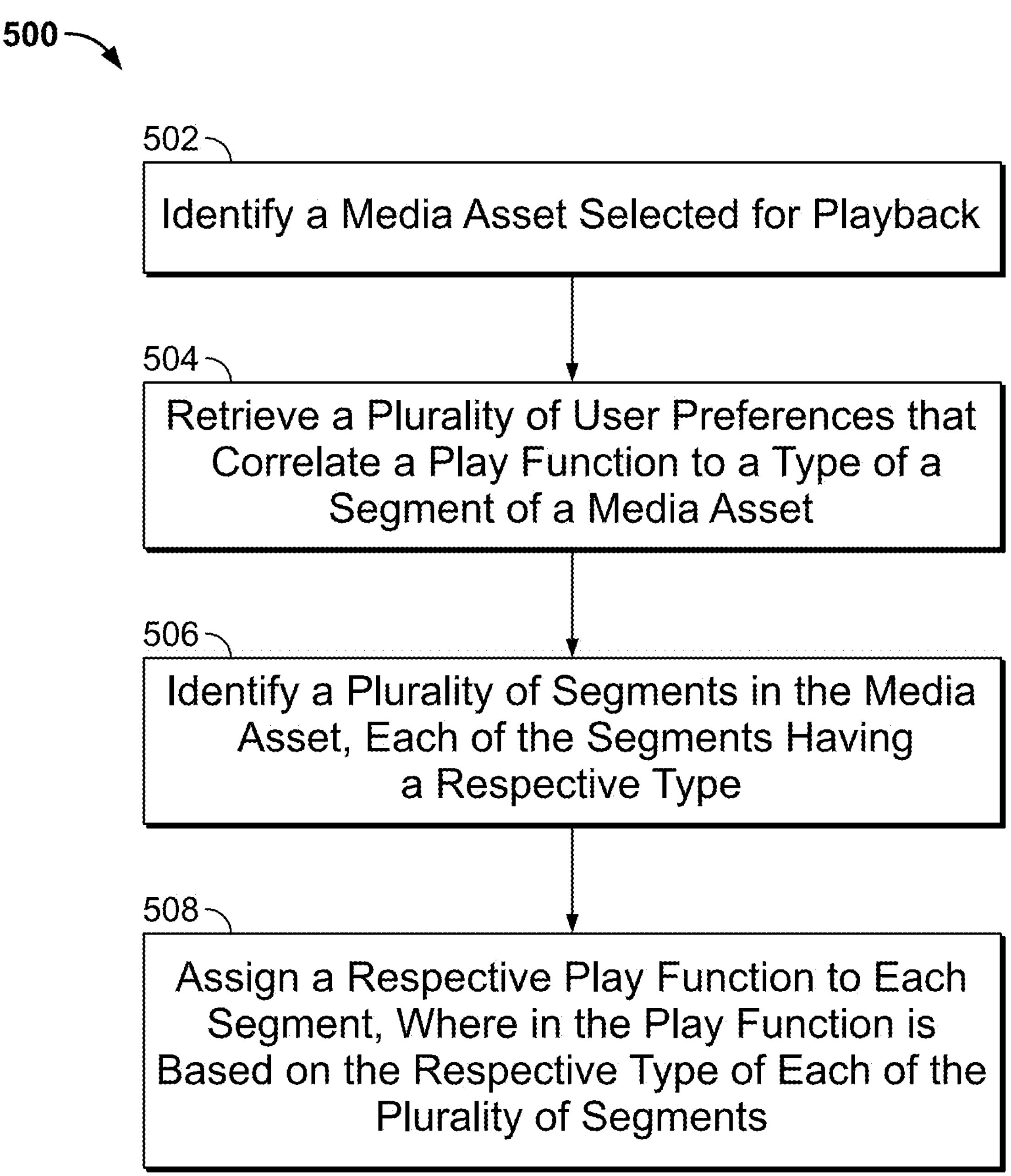
FIG. 5 is a flowchart representing a process for applying adaptive play settings to a media asset, in accordance with some embodiments of the disclosure.

FIG. 5 is a flowchart representing a process for applying adaptive play settings to a media asset, in accordance with some embodiments of the disclosure. Process 500 may be implemented on an aforementioned computing device 100, 200. In addition, one or more actions of the process 500 may be incorporated into or combined with one or more actions of any other process or embodiments described herein.

At 502, a media asset selected for playback is identified. At 504, a plurality of user preferences are retrieved, wherein the user preferences correlate a play function to a type of a segment of a media asset. At 506, a plurality of segments in the media asset selected for playback are identified, wherein each of the plurality of segments has a respective type. At 508, in response to identifying a plurality of segments in the media asset selected for playback, a respective play function is assigned to each of the respective plurality of segments based on the respective type of each of the plurality of segments.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for applying adaptive play settings to a media asset, the method comprising:

identifying a media asset selected for playback;

identifying, based on a user authentication, which user profile of a plurality of stored user profiles is active at a time the media asset is selected for playback;

retrieving, from the active stored user profile, a plurality of user preferences, wherein the user preferences correlate a play function of a plurality of play functions to a content type of a segment of a media asset, wherein each play function of the plurality of play functions corresponds to a respective playback speed;

identifying a plurality of segments in the media asset selected for playback;

determining, based on metadata associated with each segment of the plurality of segments, a respective content type for each segment of the plurality of segments;

based on identifying the plurality of segments in the media asset selected for playback, assigning a respective play function to each segment of the plurality of segments based on the respective content type of each segment of the plurality of segments; and based on determining a change in at least one user preference of the plurality of user preferences with respect to a first content type:

identifying one or more segments of the plurality of segments associated with the first content type, wherein each segment of the identified one or more segments is assigned a first play function of the plurality of play functions; and replacing, for each segment of the identified one or more segments, the first play function with a second play function of the plurality of play functions, wherein each segment of the identified one or more segments remains unreplaced in the plurality of segments for playback.

2. The method of claim 1, further comprising:

generating for display a play function map, wherein the play function map shows each segment of the plurality of segments in the media asset selected for playback and each respective play function of the plurality of play functions assigned to each segment of the plurality of segments.

3. The method of claim 2, wherein the play function map comprises a selectable interface that allows adjustment of the respective play function assigned to each segment of the plurality of segments.

4. The method of claim 1, wherein each segment of the plurality of segments comprises a scene of the media asset selected for playback.

5. The method of claim 4, wherein each scene of the media asset selected for playback is defined by a start time stamp and an end time stamp.

6. The method of claim 5, further comprising:

detecting, during playback of the media asset, a first start time stamp of a first scene;

in response to detecting the first start time stamp of the first scene, identifying a corresponding play function based on a content type of the first scene and a corresponding user preference of the plurality of user preferences;

determining the media asset has reached the first start time stamp of the first scene; and in response to determining the media asset has reached the first start time stamp of the first scene, performing the corresponding play function on the first scene.

7. The method of claim 1, wherein identifying the plurality of segments in the media asset selected for playback comprises identifying a flag in the media asset selected for playback.

8. The method of claim 1, wherein retrieving the plurality of user preferences comprises:

retrieving, from storage, an activity history corresponding to the active stored user profile, wherein the activity history comprises a viewing history of at least one media asset and at least one play action corresponding to at least one portion of the at least one media asset.

9. The method of claim 1, further comprising:

receiving an indication that an automated play function option has been enabled by a user preference setting in the active stored user profile.

10. The method of claim 9, further comprising:

in response to receiving the indication that the automated play function option has been enabled by the user preference setting in the active stored user profile, generating for display a play function map, wherein the play function map shows each segment of the plurality of segments in the media asset selected for playback and each respective play function of the plurality of play functions assigned to each segment of the plurality of segments.

11. The method of claim 1, wherein the media asset selected for playback is provided by a media streaming service and played on a device;

wherein the plurality of stored user profiles is associated with the media streaming service; and wherein the active stored user profile is currently logged into the media streaming service at the device.

12. A system for applying adaptive play settings to a media asset, the system comprising:

a communication port;

a memory storing instructions; and control circuitry communicably coupled to the memory and the communication port and configured to execute the instructions to:

identify a media asset selected for playback;

identify, based on a user authentication, which user profile of a plurality of stored user profiles is active at a time the media asset is selected for playback;

retrieve, from the active stored user profile, a plurality of user preferences, wherein the user preferences correlate a play function of a plurality of play functions to a content type of a segment of a media asset, wherein each play function of the plurality of play functions corresponds to a respective playback speed;

identify a plurality of segments in the media asset selected for playback;

determine, based on metadata associated with each segment of the plurality of segments, a respective content type for each segment of the plurality of segments;

based on identifying the plurality of segments in the media asset selected for playback, assign a respective play function to each segment of the plurality of segments based on the respective content type of each segment of the plurality of segments; and based on determining a change in at least one user preference of the plurality of user preferences with respect to a first content type:

identify one or more segments of the plurality of segments associated with the first content type, wherein each segment of the identified one or more segments is assigned a first play function of the plurality of play functions; and replace, for each segment of the identified one or more segments, the first play function with a second play function of the plurality of play functions, wherein each segment of the identified one or more segments remains unreplaced in the plurality of segments for playback.

13. The system of claim 12, wherein the control circuitry is further configured to:

generate for display a play function map, wherein the play function map shows each segment of the plurality of segments in the media asset selected for playback and each respective play function of the plurality of play function assigned to each segment of the plurality of segments.

14. The system of claim 13, wherein the control circuitry is further configured to generate the play function map with a selectable interface that allows adjustment of the respective play function assigned to each segment of the respective plurality of segments.

15. The system of claim 12, wherein the control circuitry is further configured to recognize that each segment of the plurality of segments comprises a scene of the media asset selected for playback.

16. The system of claim 15, wherein the control circuitry is further configured to determine a start time stamp and an end time stamp of each scene of the media asset selected for playback.

17. The system of claim 16, wherein the control circuitry is further configured to:

detect, during playback of the media asset, a first start time stamp of a first scene;

in response to detecting the first start time stamp of the first scene, identify a corresponding play function based on a content type of the first scene and a corresponding user preference of the plurality of user preferences;

determine the media asset has reached the first start time stamp of the first scene; and in response to determining the media asset has reached the first start time stamp of the first scene, perform the corresponding play function on the first scene.

18. The system of claim 12, wherein the control circuitry is further configured to identify the plurality of segments in the media asset selected for playback by identifying a flag in the media asset selected for playback.

19. The system of claim 12, wherein the control circuitry is further configured to retrieve the plurality of user preferences by:

retrieving, from storage, an activity history corresponding to the active stored user profile, wherein the activity history comprises a viewing history of at least one media asset and at least one play action corresponding to at least one portion of the at least one media asset.

20. The system of claim 12, wherein the control circuitry is further configured to:

in response to receiving an indication that an automated play function option has been enabled by a user preference setting in the active stored user profile, generate for display a play function map, wherein the play function map shows each segment of the plurality of segments in the media asset selected for playback and each respective play function of the plurality of play functions assigned to each segment of the plurality of segments.

* * * * *